United States Patent
Mieda et al.

[11] Patent Number: 6,155,250
[45] Date of Patent: Dec. 5, 2000

[54] HEAT GATHERING DEVICE HAVING A REFLECTION PLATE ASSEMBLY

[75] Inventors: Kenji Mieda, Hirakata; Heiji Fukutake, Toyonaka, both of Japan

[73] Assignee: Exedy Corporation, Osaka, Japan

[21] Appl. No.: 09/249,298

[22] Filed: Feb. 12, 1999

[30] Foreign Application Priority Data

Apr. 1, 1998 [JP] Japan .................................. 10-088734

[51] Int. Cl.⁷ ........................................ F24J 2/10
[52] U.S. Cl. ............................ 126/657; 126/694; 126/696
[58] Field of Search .................... 126/696, 692, 126/694, 695, 652, 657, 684; 359/867, 871, 868

[56] References Cited

U.S. PATENT DOCUMENTS

| | | | |
|---|---|---|---|
| 4,135,493 | 1/1979 | Kennedy | 126/271 |
| 4,256,091 | 3/1981 | Hallows | 126/696 |
| 4,276,873 | 7/1981 | Uroshevich | 126/438 |
| 4,390,241 | 6/1983 | Trihey | 126/696 |
| 4,416,263 | 11/1983 | Niedermeyer | 126/696 |
| 4,515,148 | 5/1985 | Boy-Marcotte et al. | 126/696 |
| 4,571,812 | 2/1986 | Gee | 126/696 |
| 4,611,575 | 9/1986 | Powell | 126/696 |

FOREIGN PATENT DOCUMENTS 2053455  2/1981  United Kingdom .

*Primary Examiner*—James C. Yeung
*Attorney, Agent, or Firm*—Shinjyu Global IP Counselors, LLP

[57] ABSTRACT

A heat gathering device 1 is provided with a reflection plate assembly 2 and a heat gathering tube 3 with a glass tube 4 surrounding the reflection plate assembly 2 and the heat gathering tube 3. The reflection plate assembly 2 is designed to provide a structure which is capable of maintaining the accuracy of a compound paraboloid in a heat gathering device having a compound paraboloid. The reflection plate assembly 2 is an assembly for gathering light having a compound paraboloid, which is formed by combining two paraboloids 21a and 21b. The reflection plate assembly 2 includes a reflection plate 21 and a plurality of brackets 22. The reflection plate 21 is formed by specularizing and forming a compound paraboloid surface through a bending process on a side where light is gathered. The brackets 22 are installed on the reflection plate 21 on an opposite side of the side where light is gathered.

30 Claims, 7 Drawing Sheets

HEAT GATHERING DEVICE HAVING A REFLECTION PLATE ASSEMBLY

BACKGROUND OF THE INVENTION

1. Field of the Invention

This invention generally relates to a reflection plate assembly. More specifically, the present invention relates to a heat gathering device having the reflection plate assembly for light gathering.

2. Background Information

Various types of devices have been suggested as devices for obtaining heat energy from sunlight through heat medium or for obtaining electric energy through solar battery. There is a device which has a reflection plate whose cross-section is a compound paraboloid, instead of a single paraboloid.

A typical conventional heat gathering device includes a reflection plate whose cross-section is a compound parabola, and a heat gathering tube. The compound parabola is a combination of a first single parabola and a second single parabola, which both have a same focus or focal point.

In an above described heat gathering device, the accuracy of the compound paraboloid surface of a reflection plate is crucial. Even a small inaccuracy of the compound paraboloid surface can result in a large decrease in the heat gathering efficiency. The reflection plate is typically made by applying several layers of coating on a sheet metal, e.g., depositing a specular surface thereon, and then forming the specular sheet metal into a compound paraboloid. Since the specular sheet is too thin to be used on a presswork device, the specular sheet metal is typically formed into the shape of the reflection plate by bending.

When the specular sheet metal is bent to form a compound paraboloid, it is difficult to maintain the accuracy of measurement. Although using a presswork device would improve the accuracy of the specular surface, it is difficult to use a presswork device on a specularized sheet metal. Coating the sheet metal with resin or thickening the sheet metal maintains the accuracy of the measurement. But increases cost and weight of the reflection plate.

In view of the above, there exists a need for a reflection plate assembly of a heat gathering device that overcomes the above mentioned problems in the prior art. This invention addresses this need in the prior art as well as other needs, which will become apparent to those skilled in the art from this disclosure.

SUMMARY OF THE INVENTION

An object of the present invention is to provide with a reflection plate assembly in which the accuracy of a compound paraboloid can be maintained.

Another purpose of the present invention is to provide a heat gathering device having a reflection plate assembly in which the accuracy of a compound paraboloid can be maintained.

A reflection plate assembly in accordance with one aspect of the present invention is attained by providing a reflection plate assembly for light gathering that has a compound paraboloid formed by combining a plurality of paraboloids. The reflection plate assembly includes a reflection plate and a plurality of brackets. The reflection plate is formed by specularizing and bending a sheet metal to form a compound paraboloid on a side where light is gathered. Each of the plurality of brackets is installed on the opposite side of the side where light is gathered.

By installing the plurality of brackets on the reflection plate, the shape of the compound paraboloid can be maintained accurately. By placing the plurality of brackets in proper positions, the total weight of the reflection plate assembly can be made lighter than the case where the accuracy of a compound paraboloid is maintained by thickening the entire reflection plate. In a reflection plate assembly of the present invention, the reflection plate is specularized through coating.

In a reflection plate assembly of the present invention, the brackets are in the shape of a rib having a projecting portion. Since the brackets are in the shape of a rib, the brackets can be made lighter while maintaining the rigidity of the brackets, which is necessary to maintain the accuracy of the compound paraboloid of the reflection plate.

A reflection plate assembly of the present invention is shaped such that an identical cross-section extends longitudinally and the reflection plate is divided into a plurality of longitudinal portions. The brackets are installed at least on the longitudinal positions where the reflection plate is divided. Since the reflection plate is divided longitudinally, the yield factor in production of the reflection plate improves. The divided reflection plates are integrated together by the brackets. This way, by using the brackets, the accuracy of the reflection plate is maintained. Besides, a plurality of reflection plates can be connected serially in a longitudinal direction by using the brackets, which is another effect of the present invention.

In a reflection plate assembly, the brackets are bonded to the reflection plate with a means of adhesion such as adhesives and double-coated adhesive tape.

In a reflection plate assembly of the present invention, the brackets are made of either same kinds of material whose heat expansion rates are identical, or different kinds of material whose heat expansion rates are substantially similar. The brackets include an engagement portion which engages with the reflection plate.

In this invention, the engagement portion is formed on the brackets. The brackets are installed on the reflection plate by engaging the engagement portion with the reflection plate. When the brackets are installed this way, using the reflection plate and the brackets made of different kinds of material whose heat expansion rates are different can cause a deformation in the compound paraboloid. In this invention, however, the reflection plate and the brackets are made of either same kinds of material whose heat expansion rates are identical, or different kinds of material whose heat expansion rates are substantially similar. Therefore, there is almost no deformation from a change of the temperature in the compound paraboloid.

A reflection plate of the present invention has a compound paraboloid formed by combining a plurality of paraboloids. The reflection plate assembly includes a plurality of reflection plates and a plurality of brackets. The reflection plates are formed by being specularized and bent to form a single paraboloid on a side where light is gathered. The brackets are installed on a surface of a side opposite the side where light is gathered.

In this invention, a compound paraboloid is formed by integrating a plurality of reflection plates having a single paraboloid by using the brackets. Therefore, it is easier to form a reflection plate and also to maintain the accuracy of the shape than the case where a single reflection plate is formed into a shape having a compound paraboloid. If the brackets which connect the plurality of reflection plates have higher rigidity than the rigidity of the reflection plates, the accuracy of the compound paraboloid can be maintained.

A heat gathering device of the present invention is a device for obtaining energy via heat medium and includes a reflection plate assembly, a heat gathering tube, and a heat medium. The reflection plate assembly has a reflection plate and a plurality of brackets. Light comes into the reflection plate assembly. The heat gathering tube is disposed where light reflected from the reflection plate assembly accumulates. The heat medium flows inside the heat gathering tube.

These and other objects, features, aspects and advantages of the present invention will become apparent to those skilled in the art from the following detailed description, which, taken in conjunction with the annexed drawings, discloses several preferred embodiments of the present invention.

BRIEF DESCRIPTION OF THE DRAWINGS

Referring now to the attached drawings which form a part of this original disclosure.

Similar reference numerals denote corresponding features consistently throughout the attached drawings.

DETAILED DESCRIPTION OF THE PREFERRED EMBODIMENTS

Figure 1:
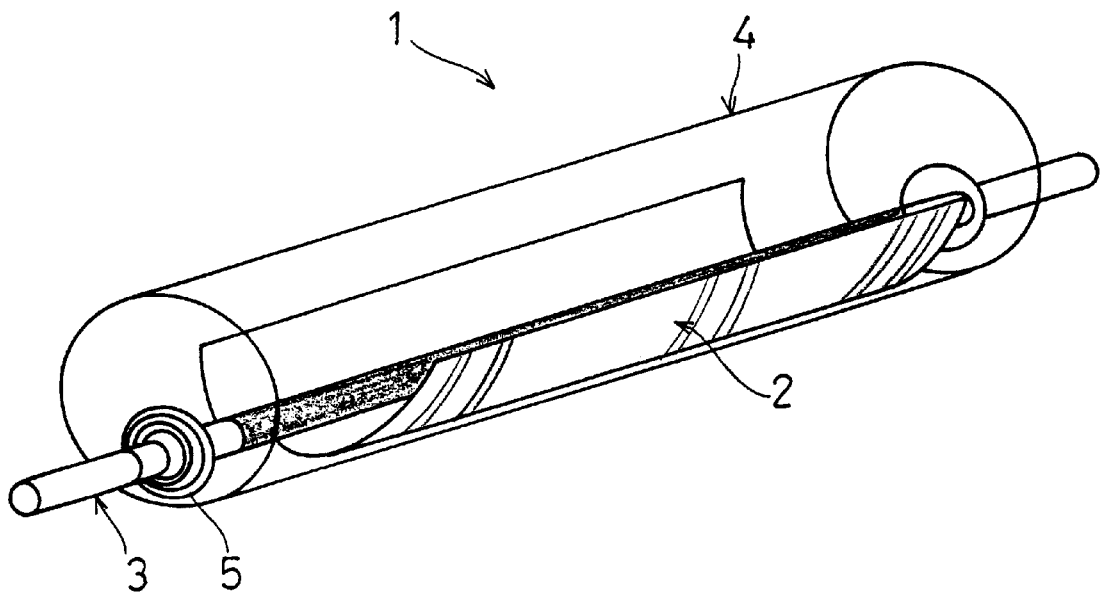
FIG. 1 is a schematic perspective view of a heat gathering device with a reflection plate assembly in accordance with one embodiment of the present invention.

Referring initially to FIG. 1, an example of a heat gathering device 1 illustrated for gathering heat via a heat medium in accordance with one embodiment of the present invention. The heat gathering device 1 comprises a reflection plate assembly 2 and a heat gathering tube 3. In this embodiment, the heat gathering device 1 further includes a glass tube 4 surrounding the reflection plate 2 and the heat gathering tube 3. Three support brackets 22 are fixedly coupled to reflection plate assembly 2.

Figure 2:
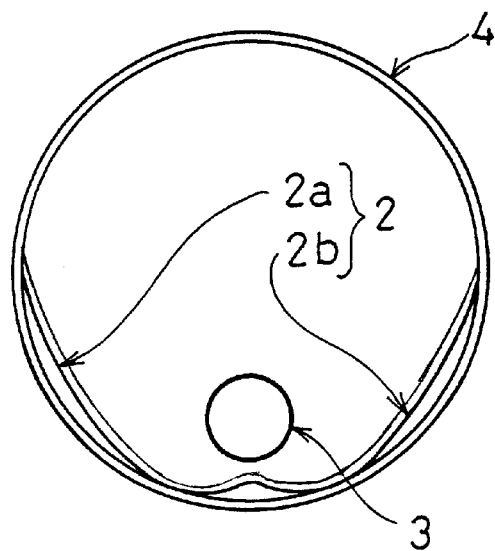
FIG. 2 is a schematic cross-sectional view of a heat gathering device illustrated in FIG. 1.

As shown in FIG. 2 (a cross-sectional view of the heat gathering device 1), the cross-section of the reflection plate 2 is a compound parabola. The compound parabola is symmetrical about the center and has a left portion 2a and a right portion 2b, each of which being a single paraboloid. The reflection plate 2 is disposed inside the glass tube 4, whose internal space is a vacuum. The heat gathering tube 3 passes through the glass tube 4, and is disposed in a space enclosed with the left portion 2a and the right portion 2b of the reflection plate 2, such that the cross-sectional position of heat gathering tube 3 corresponds to the focus or focal point of the compound parabola of the reflection plate 2.

At the end portions where the heat gathering tube 3 comes out of the glass tube 4, a bellows 5 is installed to prevent heat expansion of the heat gathering tube 3 from damaging glass tube 4. Heat medium such as oil flows inside the heat gathering tube 3. This heat medium absorbs heat energy that the reflection plate 2 gathers in the heat gathering tube 3. The heat energy is then transferred in a conventional manner, which will not be discussed herein. The heat energy gathered in this way is used for various purposes such as power generation, cooling, and grain drying.

Figure 3:
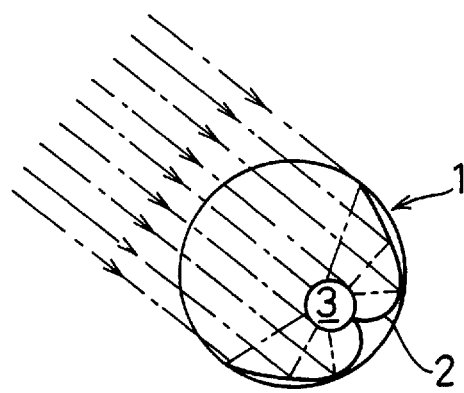
FIG. 3 is a schematic end elevational view of a heat gathering device illustrated in FIG. 1.
Figure 4:
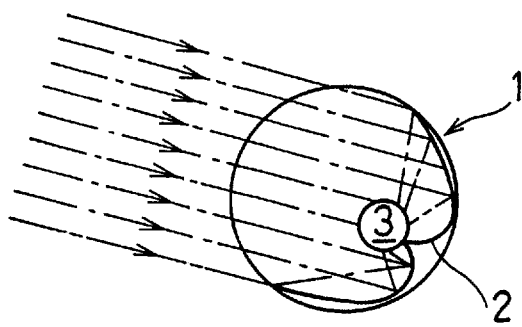
FIG. 4 is a schematic end elevational view of a heat gathering device illustrated in FIG. 1.
Figure 5:
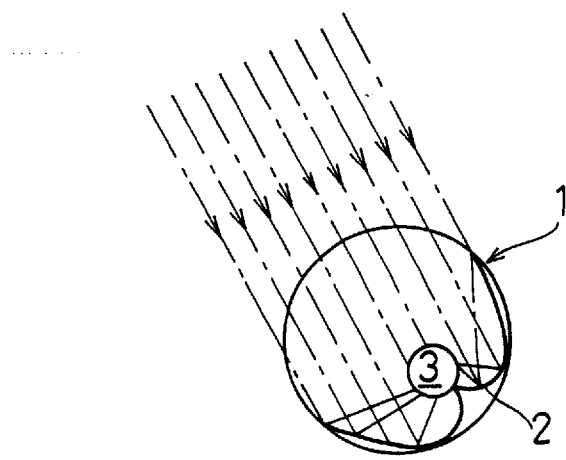
FIG. 5 is a schematic end elevational view of a heat gathering device illustrated in FIG. 1.

The angle of the heat gathering device 1 does not need adjusting according to the position of the sun, thereby enabling an efficient heat gathering from the sun. FIGS. 3 through 5 are schematic drawings of the heat gathering device 1 collecting light (heat) from the sun. The heat gathering device 1 is disposed such that the longitudinal direction of the heat gathering device 1 points the East and the West and the heat gathering device 1 rotates in a latitudinal direction to change the elevation angle. Vectors shown as dashed lines in FIG. 3 through 5 represent sunlight. FIG. 3 is sunlight at noon on either vernal equinox or autumnal equinox. FIG. 4 is sunlight at noon on summer solstice. FIG. 5 is sunlight at noon on winter solstice. As shown in FIGS. 3 through 5, since the reflection plate 2 includes a compound paraboloid, a wide range of sunlight can be gathered in the heat gathering tube 3 efficiently even when the angle of incidence of sunlight into the heat gathering device 1 changes.

Figure 6:
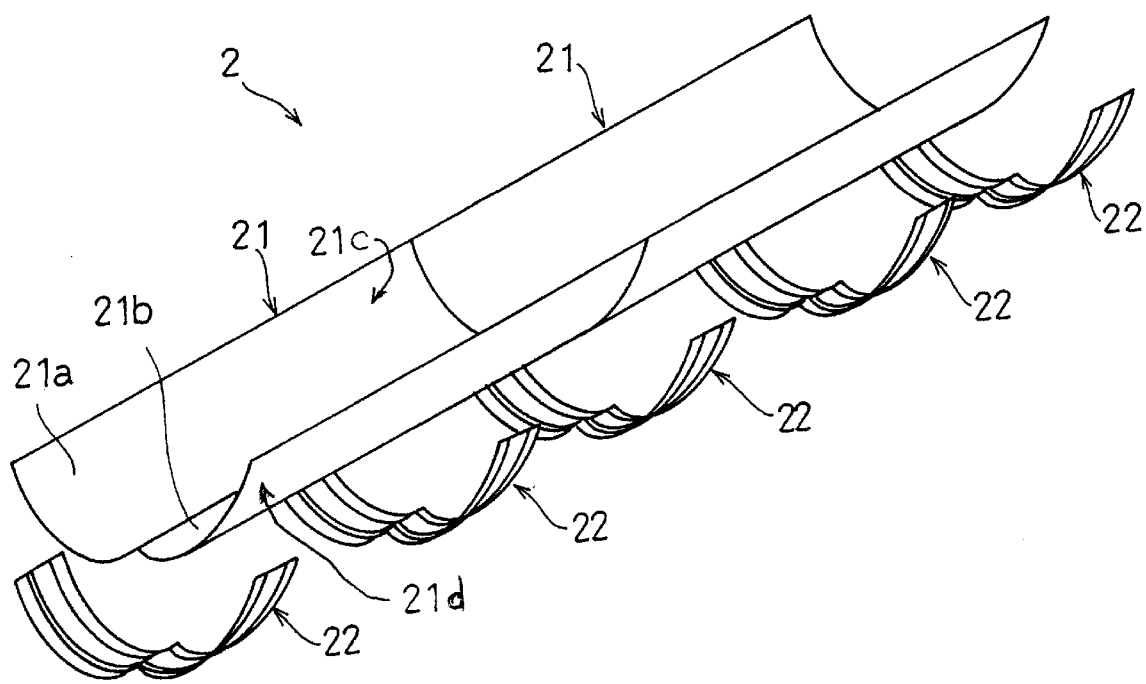
FIG. 6 is an exploded perspective view of a modified reflection plate assembly for a heat gathering device similar to the one illustrated in FIG. 1 in accordance with another embodiment of the present invention.

Referring now to FIG. 6, a reflection plate assembly 2 as an embodiment of the present invention is illustrated. The reflection plate assembly 2 includes a plurality of reflection plates 21 and a plurality of brackets 22. This embodiment of FIG. 6 is adapted to be used in the heat gathering device 1 which is illustrated in FIGS. 1 and 2. Accordingly, similar reference numerals will be used in this embodiment to denote features corresponding to the similar features of the prior embodiment.

The reflection plates 21 are flume-shaped members. The cross-section of each of the reflection plates 21 includes a compound parabola which has one focus or focal point. The reflection plate 21 has a concave surface 21c and convex surface 21d. The concave surface 21c has a specular finish. The compound paraboloid of each reflection plate 21 is a compound paraboloid formed of a single paraboloid 21a and a single paraboloid 21b. The single paraboloid 21b is symmetrical to the single paraboloid 21a about the center of the compound paraboloid. The reflection plate assembly 2 shown in FIG. 6 includes two reflection plates 21 which are supported and connected serially by the brackets 22. It will be apparent to those skilled in the art that more than two reflection plates 21 can be serially connected by the brackets 22. Also, fewer or more brackets 22 can be used on each of the reflection plates 21.

The reflection plates 21 are made of aluminum of high purity. Each reflection plate 21 is formed by coating a flat aluminum plate with resin thereby depositing a specular surface, and bending the plate to form a compound paraboloid as shown in FIG. 6. The thickness of the reflection plates 21 are equal to or less than about 1 millimeter.

The brackets 22 are made of band plates made of pure aluminum type metal. The band plates are pressed such that a cross-section of each band plate is in the shape shown in FIG. 7 or FIG. 8 and also the shape of the band plates correspond to the shape of the reflection plates 21 shown in FIG. 6.

Figure 7:
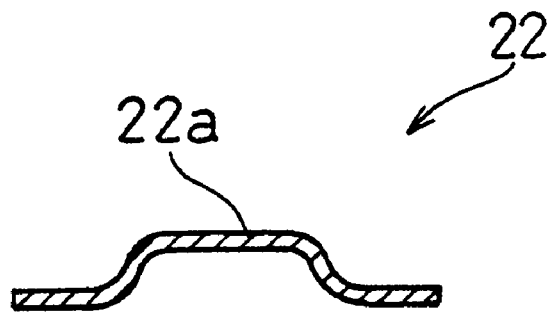
FIG. 7 is a transverse cross-sectional view of the bracket for the reflection plate assembly illustrated in FIG. 5.

As shown in FIG. 7, the cross-section of each bracket 22 has a projecting portion 22a, which adheres to the convex surface or rear face 21d of the reflection plate 21. The reflection plates 21 and the brackets 22 are adhered to one another with adhesive or double-coated adhesive tape. The thickness of each bracket 22 is preferably smaller than about 1 mm and greater than the thickness of the reflection plate 21.

The reflection plate assembly 2 is formed by binding a plurality of reflection plates 21 together via brackets 22. The brackets 22 are installed in between the reflection plates 21. In this embodiment shown in FIG. 6, one bracket is installed in an intermediate portion of each of the reflection plates 21 to maintain the rigidity.

In this embodiment, by installing a plurality of brackets 22 on the reflection plates 21, the accuracy of the shape of the compound paraboloid in the reflection plate 21 is maintained. Also the weight of the reflection plate assembly 2 is lighter than the case where the accuracy of the compound paraboloid is maintained by making the reflection plate 21 thicker.

In this embodiment, since the brackets 22 are rib-shaped with a projecting portion 22a, it is possible to reduce the thickness of the bracket 22 and reduce the number of brackets 22, which are necessary to maintain the accuracy of the compound paraboloid in the reflection plate 21. This way, the weight of the reflection plate assembly 2 can be reduced.

Also in this embodiment, since several reflection plates 21 are connected in a longitudinal direction, a yield in producing reflection plates 21 is improved.

Figure 8:
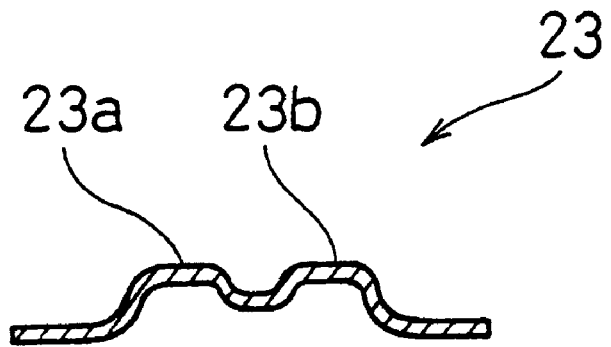
FIG. 8 is a transverse cross-sectional view of another embodiment of a bracket in accordance with the present invention.

The bracket 23 which has two projecting portions 23a and 23b as shown in FIG. 8 can be used to maintain the accuracy of the compound paraboloid of the reflection plate 21 and to bind the reflection paraboloids 21, instead of the bracket 22 with the cross-section as shown in FIG. 7.

Figure 9:
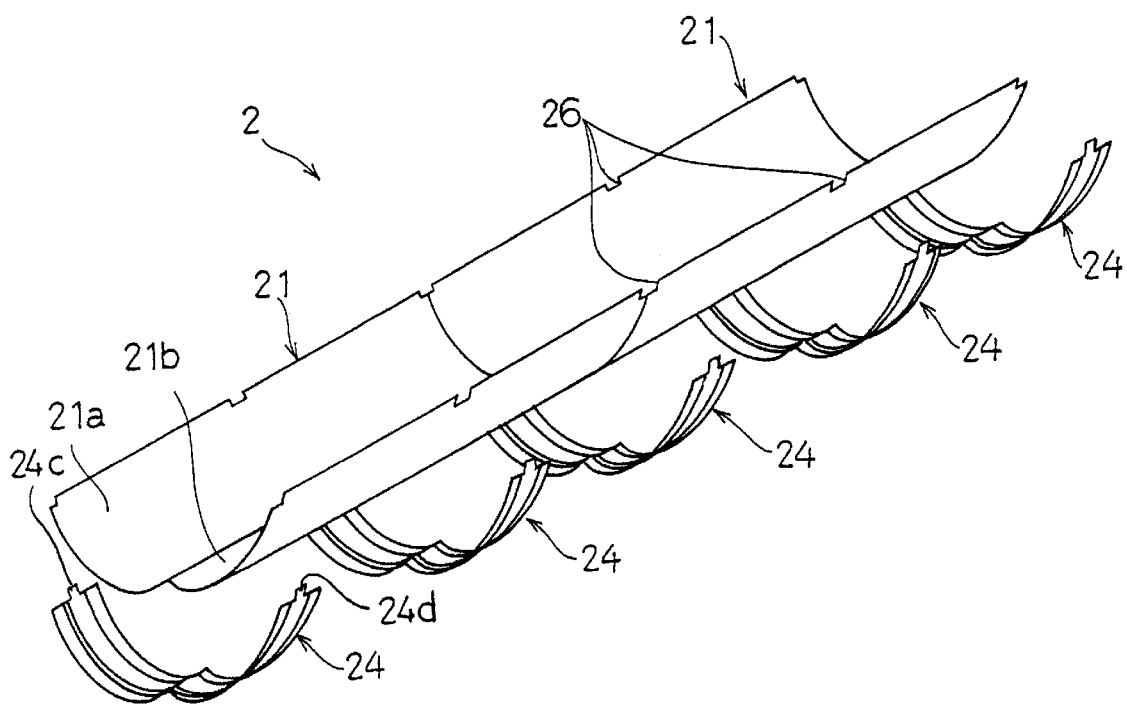
FIG. 9 is a perspective view of another embodiment of a reflection plate assembly with a plurality of brackets.
Figure 10:
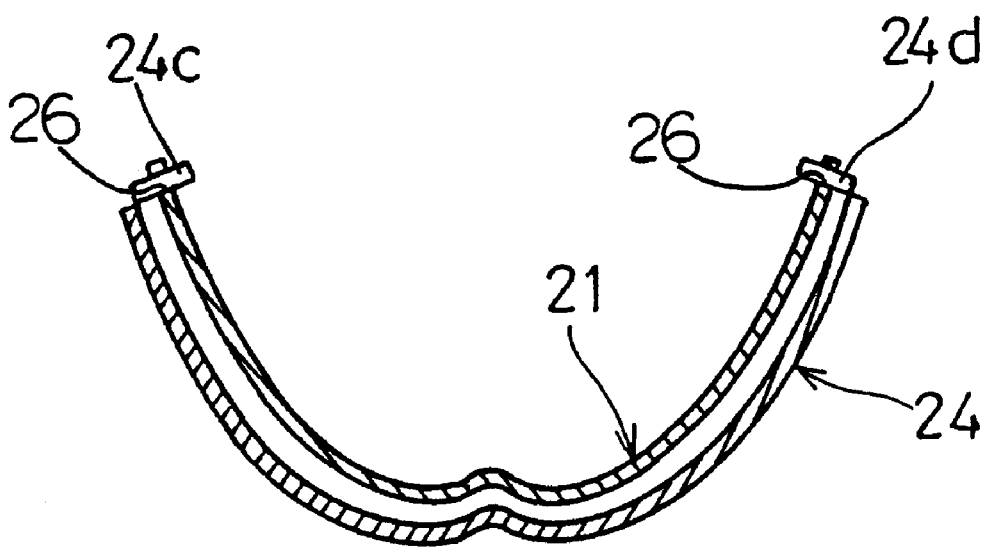
FIG. 10 is a cross-sectional view of the reflection plate assembly of FIG. 9 with the bracket partially installed on the reflection plate.

As seen in FIGS. 9 and 10, the accuracy of the compound paraboloid of the reflection plate 21 can be maintained by installing a bracket 24 on the reflection plate 21 that has tabs (engagement portions) 24c and 24d at both ends as shown in FIG. 9. Instead of bonding the brackets 22 to the reflection plate 21, tabs 24c and 24d of brackets 24 are bent to engage reflection plates 21. In this embodiment, the bracket 24 is made of pure aluminum type metal. The tabs 24c and 24d engage notches 26 which are formed at ends of the reflection plates 21.

Figure 11:
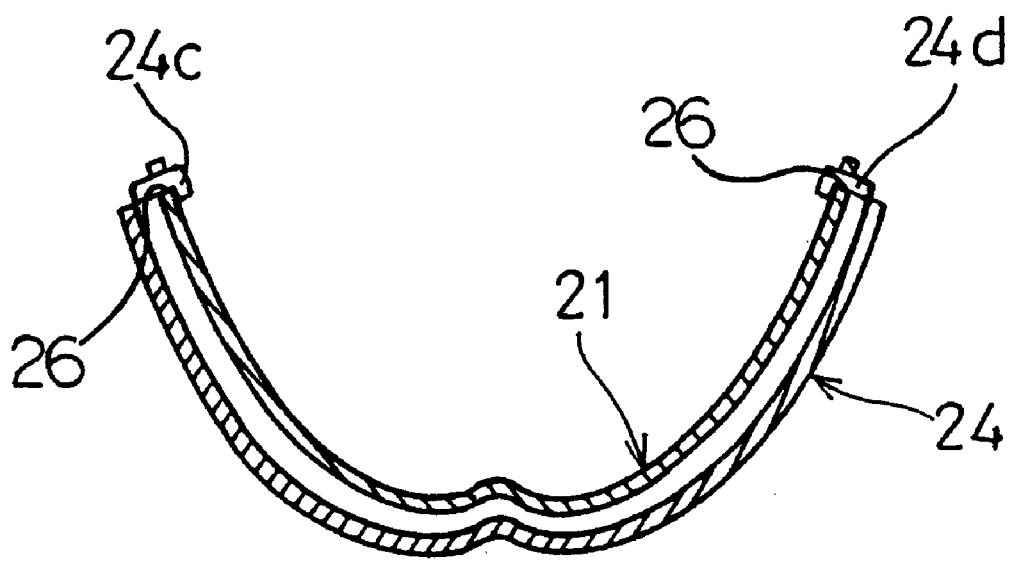
FIG. 11 is a cross-sectional view of the reflection plate assembly of FIGS. 9 and 10 with the bracket completely secured thereto.

Also in this embodiment, since the notches 26 engage with the tabs 24c and 24d, it is easy to position the brackets 24 relative to the reflection plates 21 at the time of assembly. The way to engage the tabs 24c and 24d with the notches 26 can be either by bending and inserting the tabs 24c and 24d into the notches 26 as shown in FIGS. 10 and 11, or by bending and inserting the tabs 24c and 24d into the notches 26 and further bending tip portions of the tabs 24c and 24d along the reflection plates 21.

When the reflection plates 21 and the brackets 22, 23 or 24 are adhered to one another in these methods, since the reflection plates 21 and the brackets 22, 23 or 24 are made of similar materials which have substantially similar heat expansion rate, the compound paraboloid in the reflection plate 21 hardly deforms from temperature change.

Each of the reflection plates 21 can be manufactured as two separate portions, one which includes first paraboloid 21a and one which includes second paraboloid 21b. In this embodiment, the compound paraboloid of the reflection plate 21 is formed by combining a reflection plate having a single paraboloid 21a and a reflection plate having a single paraboloid 21b with brackets 22. This way, it is easier to maintain the accuracy of the specular surface after bending and forming than the case where a compound paraboloid is formed only by bending and forming.

In the present invention, by installing a plurality of brackets 22, 23 or 24 on reflection plates 21, the accuracy of the shape a compound paraboloid can be maintained. Also, it is possible to connect a plurality of reflection plates 21 serially in a longitudinal direction.

While only four embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A reflection plate assembly for light gathering comprising:
    a flume-shaped reflection plate having a longitudinal length, a first elongated surface, a second elongated surface and a transverse cross-section that includes a compound parabola with substantially a single focal point, with said first surface having a specula finish and being closer to said focal point, and said second surface being on the opposite side of said first surface; and
    a plurality of brackets fixedly coupled to said second surface of said reflection plate to maintain said compound parabola of said reflection plate, each of said plurality of brackets having a compound parabolic cross-section that corresponds to said transverse cross-section of said reflection plate.

2. A reflection plate assembly as set forth in claim 1, wherein
    said transverse cross-section of said reflection plate includes a first parabola and a second parabola which form said compound parabola.

3. A reflection plate assembly as set forth in claim 2, wherein
    said brackets have contoured surface with a rib having a projecting portion that engages said second surface of said reflection plate.

4. A reflection plate assembly as set forth in claim 2, wherein
    said reflection plate is divided into a plurality of reflection portions such that each of said reflection portions has a longitudinal length that is smaller than said longitudinal length of said reflection plate; and
    said brackets are installed at least at longitudinal positions where said reflection portions attach to one another to thereby connect together said reflection portions that are adjacent to each other.

5. A reflection plate assembly as set forth in claim 4, wherein
    said reflection plate and said brackets are made of the same material with identical heat expansion rates.

6. A reflection plate assembly as set forth in claim 1, wherein said first surface of said reflection plate has a coating that forms said specular finish.

7. A reflection plate assembly as set forth in claim 1, wherein said brackets have contoured surface with a rib having a projecting portion that engages said second surface of said reflection plate.

8. A reflection plate assembly as set forth in claim 1, wherein said cross-section of said reflection plate is substantially uniform along said longitudinal length.

9. A reflection plate assembly as set forth in claim 8, wherein said reflection plate is divided into a plurality of reflection portions such that each of said reflection portions has a longitudinal length that is smaller than said longitudinal length of said reflection plate; and said brackets are installed at least at longitudinal positions where said reflection portions attach to one another to thereby connect together said reflection portions that are adjacent to each other.

10. A reflection plate assembly as set forth in claim 1, wherein said reflection plate is divided into a plurality of reflection portions such that each of said reflection portions has a longitudinal length that is smaller than said longitudinal length of said reflection plate; and said brackets are installed at least at longitudinal positions where said reflection portions attach to one another to thereby connect together said reflection portions that are adjacent to each other.

11. A reflection plate assembly as set forth in claim 1, wherein said brackets are adhesively coupled to said second surface of said reflection plate.

12. A reflection plate assembly as set forth in claim 1, wherein said reflection plate and said brackets are made of materials which have substantially identical heat expansion rates.

13. A reflection plate assembly as set forth in claim 1, wherein said brackets are adhered to said reflection plate with adhesive.

14. A reflection plate assembly for light gathering comprising:

a flume-shaped reflection plate having a longitudinal length, a first elongated surface, a second elongated surface and a transverse cross-section that includes a compound parabola with substantially a single focal point, with said first surface having a specula finish and being closer to said focal point, and said second surface being on the opposite side of said first surface, said reflection plate further including a plurality of notches; and a plurality of brackets fixedly coupled to said second surface of said reflection plate to maintain said compound parabola, said brackets further including engagement portions engaged with said notches of said reflection plate.

15. A reflection plate assembly as set forth in claim 14, wherein said reflection plate and said brackets are made of materials which have substantially identical heat expansion rates.

16. A heat gathering device for gathering heat via heat medium, comprising:

a flume-shaped reflection plate having a longitudinal length, a first elongated surface, a second elongated surface and a transverse cross-section that includes a compound parabola with substantially a single focal point, with said first surface having a specula finish and being closer to said focal point, and said second surface being on the opposite side of said first surface;

a plurality of brackets fixedly coupled to said second surface of said reflection plate to maintain said compound parabola of said reflection plate, each of said plurality of brackets having a compound parabolic cross-section that corresponds to said transverse cross-section of said reflection plate; and a heat gathering tube disposed longitudinally relative to said reflection plate such that said heat gathering tube is located along said focal point of said compound paraboloid.

17. A heat gathering device as set forth in claim 16, wherein said transverse cross-section of said reflection plate includes a first parabola and a second parabola which form said compound parabola.

18. A heat gathering device as set forth in claim 17, wherein said brackets have contoured surface with a rib having a projecting portion that engages said second surface of said reflection plate.

19. A heat gathering device as set forth in claim 17, wherein said reflection plate is divided into a plurality of reflection portions such that each of said reflection portions has a longitudinal length that is smaller than said longitudinal length of said reflection plate; and said brackets are installed at least at longitudinal positions where said reflection portions attach to one another to thereby connect together said reflection portions that are adjacent to each other.

20. A heat gathering device as set forth in claim 19, wherein said reflection plate and said brackets are made of the same material with identical heat expansion rates.

21. A heat gathering device as set forth in claim 16, wherein said first surface of said reflection plate has a coating that forms said specular finish.

22. A heat gathering device as set forth in claim 16, wherein said brackets have contoured surface with a rib having a projecting portion that engages said second surface of said reflection plate.

23. A heat gathering device as set forth in claim 16, wherein said cross-section of said reflection plate is substantially uniform along said longitudinal length.

24. A heat gathering device as set forth in claim 23, wherein said reflection plate is divided into a plurality of reflection portions such that each of said reflection portions has a longitudinal length that is smaller than said longitudinal length of said reflection plate; and said brackets are installed at least at longitudinal positions where said reflection portions attach to one another to thereby connect together said reflection portions that are adjacent to each other.

25. A heat gathering device as set forth in claim 16, wherein said reflection plate is divided into a plurality of reflection portions such that each of said reflection portions has a longitudinal length that is smaller than said longitudinal length of said reflection plate; and said brackets are installed at least at longitudinal positions where said reflection portions attach to one another to thereby connect together said reflection portions that are adjacent to each other.

26. A heat gathering device as set forth in claim 16, wherein said brackets are adhesively coupled to said second surface of said reflection plate.

27. A heat gathering device as set forth in claim 16, wherein said reflection plate and said brackets are made of materials which have substantially identical heat expansion rates.

28. A heat gathering device as set forth in claim 16, wherein said brackets are adhered to said reflection plate with adhesive.

29. A heat gathering device for gathering heat via heat medium, comprising:

a flume-shaped reflection plate having a longitudinal length, a first elongated surface, a second elongated surface and a transverse cross-section that includes a compound parabola with substantially a single focal point, with said first surface having a specula finish and being closer to said focal point, and said second surface being on the opposite side of said first surface, said reflection plate further including a plurality of notches;

a plurality of brackets fixedly coupled to said second surface of said reflection plate to maintain said compound parabola, said brackets further including engagement portions engaged with said notches of said reflection plate; and a heat gathering tube disposed longitudinally relative to said reflection plate such that said heat gathering tube is located along said focal point of said compound paraboloid.

30. A heat gathering device as set forth in claim 29, wherein said reflection plate and said brackets are made of materials which have substantially identical heat expansion rates.

* * * * *